(12) United States Patent
Ueno et al.

(10) Patent No.: US 8,432,295 B2
(45) Date of Patent: Apr. 30, 2013

(54) ROAD TRAFFIC INFORMATION PROVIDING SYSTEM, ROAD TRAFFIC INFORMATION PROVIDING DEVICE, ROAD TRAFFIC INFORMATION PROVIDING METHOD, AND PROGRAM

(75) Inventors: Masahiro Ueno, Suginami-ku (JP); Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 370 days.

(21) Appl. No.: 12/808,448

(22) PCT Filed: Dec. 18, 2008

(86) PCT No.: PCT/JP2008/073034
§ 371 (c)(1), (2), (4) Date: Jun. 16, 2010

(87) PCT Pub. No.: WO2009/081830
PCT Pub. Date: Jul. 2, 2009

(65) Prior Publication Data
US 2010/0265099 A1      Oct. 21, 2010

(30) Foreign Application Priority Data

Dec. 21, 2007   (JP) ................... 2007-331081

(51) Int. Cl.
*G08G 1/09* (2006.01)
(52) U.S. Cl.
USPC ............... 340/905; 340/995.13; 701/400
(58) Field of Classification Search .......... 340/905, 340/995.1, 995.12, 995.13, 996, 901; 701/201, 701/400, 428, 441
See application file for complete search history.

(56) References Cited

U.S. PATENT DOCUMENTS 5,508,917 A * 4/1996 Siegle et al. ............ 701/428
5,732,324 A   3/1998 Rieger, III
(Continued)

FOREIGN PATENT DOCUMENTS

| EP | 1 229 508 A | 8/2002 |
|----|---|---|
| JP | 10-104005 | 4/1998 |

(Continued)

OTHER PUBLICATIONS

Supplementary European Search Report (Application No. 08864488.5) dated Jun. 8, 2012.

(Continued)

*Primary Examiner* — Toan N Pham
(74) *Attorney, Agent, or Firm* — Eric J. Robinson; Robinson Intellectual Property Law Office, P.C.

(57) ABSTRACT

A utterance type road traffic information providing system comprises a roadside apparatus (100) installed along a road where vehicles travel, in a parking lot, or near a parking lot and adapted for transmitting alarm information by wireless communication, a utterance type vehicle-mounted device (200) adapted for receiving the alarm information by wireless communication from the roadside apparatus (100) and outputting the alarm information and mounted in the vehicle, and a administration server (300) for communicating various information with the roadside apparatus (100). The utterance type vehicle-mounted device (200) has a predetermined operating unit and a control unit. The control unit provides again a utterance type output from the beginning by sound according to the alarm information supplied from the roadside apparatus (100) when a predetermined operation of the operating unit is made. By a simple method, the alarm information is again confirmed (re-outputted).

10 Claims, 11 Drawing Sheets

U.S. PATENT DOCUMENTS

| | | | | |
|---|---|---|---|---|
| 5,819,198 | A * | 10/1998 | Peretz | 701/117 |
| 5,839,086 | A * | 11/1998 | Hirano | 701/420 |
| 6,466,862 | B1 * | 10/2002 | DeKock et al. | 701/117 |
| 6,943,702 | B2 * | 9/2005 | Kato | 340/988 |
| 7,427,928 | B2 * | 9/2008 | Crocker et al. | 340/902 |
| 8,165,748 | B2 * | 4/2012 | Goto et al. | 701/36 |

FOREIGN PATENT DOCUMENTS

| | | |
|---|---|---|
| JP | 10-105192 | 4/1998 |
| JP | 2004-271249 | 9/2004 |
| JP | 2006-127359 | 5/2006 |
| JP | 2006-202199 | 8/2006 |

OTHER PUBLICATIONS

Notification of Transmittal of Translation of the International Preliminary Report on Patentability (Application No. PCT/JP2008/073034) dated Jul. 29, 2010.

International Search Report for Application Serial No. PCT/JP2008/073034.

Written Notification of Reason for Refusal (Application No. 2007-331081) dated Jul. 3, 2012.

International Search Report for Application Application Serial No. PCT/JP2008/073034, dated Apr. 7, 2009.

* cited by examiner

*FIG. 11*

| TRAFFIC INFORMATION TYPE |
| --- |
| ROADSIDE APPARATUS ID |
| ROAD TYPE |
| LANE TYPE (INBOUND/OUTBOUND LANE) |
| LANE TYPE (LOOP LINE) |
| DIRECTION INFORMATION |
| ROADSIDE NUMBER |
| TEXT INFORMATION |
| STATIONARY IMAGE INFORMATION |
| SPEECH INFORMATION |

ROAD TRAFFIC INFORMATION PROVIDING SYSTEM, ROAD TRAFFIC INFORMATION PROVIDING DEVICE, ROAD TRAFFIC INFORMATION PROVIDING METHOD, AND PROGRAM

TECHNICAL FIELD

The present invention relates to a road traffic information providing system, a road traffic information providing device, a road traffic information providing method, and a program

BACKGROUND ART

Accurately reporting the traffic condition by providing alarm information (such as road traffic information) with appropriate content at appropriate time is useful for the driver to comfortably and safely drive the vehicle. Congestion status of road, road regulation status due to an occurrence of accident or implementation of construction, road surface condition, and weather condition (for example, temperature and visibility) are typical useful road traffic information.

One of the road traffic information providing systems recently being developed is a road traffic information providing system using DSRC (Dedicated Short Range Communications) for providing road traffic information to a driver and the like of a vehicle mounted with an ETC vehicle-mounted device (for example, see Patent Document 1).

Patent Document 1: Japanese Patent Application Laid-Open No. 2005-258726

DISCLOSURE OF THE INVENTION

Problems to be Solved by the Invention

By the way, equipment of the vehicle-mounted device used in the DSRC road traffic information providing system can be roughly classified into two types: an ITS vehicle-mounted device cooperating with or incorporated into a navigation apparatus (ITS vehicle-mounted device <integral type>); and an utterance type vehicle-mounted device that only outputs speech such as a conventional radio apparatus (ITS vehicle-mounted device <utterance type>). The utterance type vehicle-mounted device can be provided on a vehicle and the like not provided with the navigation apparatus, such as a truck, a commercial vehicle, and a light vehicle.

In the DSRC road traffic information providing system adopting the ITS vehicle-mounted device as a vehicle-mounted device, if alarm information is received from a roadside apparatus, the vehicle-mounted device can consider position information and the like acquired by the navigation apparatus to output the received alarm information at predetermined timing.

On the other hand, the DSRC road traffic information providing system adopting the utterance type vehicle-mounted device as a vehicle-mounted device is not designed to cooperate with the navigation apparatus, and position information, traveling direction information, and the like cannot be acquired. Therefore, in the DSRC road traffic information providing system adopting the utterance type vehicle-mounted device as a vehicle-mounted device, the priority and the like of the received alarm information need to be determined to determine the order of output (utterance output) without considering the position information and the like.

In this way, the ITS vehicle-mounted device cooperates with the navigation apparatus to allow various high-grade controls. On the other hand, the utterance type vehicle-mounted device cannot perform such controls. Therefore, important alarm information is suddenly outputted when the driver is concentrating on driving, and there is a great risk of failing to hear the important alarm information.

The present invention has been made in view of the problem, and an object of the present invention is to provide a road traffic information providing system, a road traffic information providing device, a road traffic information providing method, and a program capable of confirming alarm information again (output twice) with a simple method.

Means for Solving the Problems

To attain the object, a road traffic information providing device of the present invention is a road traffic information providing device that receives alarm information from a roadside apparatus installed on or near a road that a vehicle travels or a parking lot through wireless communication and that outputs the alarm information, the road traffic information providing device comprising: a predetermined operation unit; and a control unit, wherein the control unit controls to output alarm information supplied by the roadside apparatus in utterance again from the top by speech based on a predetermined operation of the operation unit if other alarm information is not outputted in utterance.

According to a second aspect of the present invention, a road traffic information providing device of the present invention is a road traffic information providing device that receives alarm information from a roadside apparatus installed on or near a road that a vehicle travels or a parking lot through wireless communication and that outputs the alarm information, the road traffic information providing device comprising: a communication unit that receives the alarm information from the roadside apparatus at timing at which a link is set up with the roadside apparatus; a storage unit that stores the alarm information; an audio processing unit that converts the alarm information into speech information to output the speech information in utterance; an operation unit that controls the utterance output as needed; and alarm information transfer means for reading out the alarm information stored in the storage unit according to the priority to transfer the alarm information to the audio processing unit if the operation of the operation unit is not performed and for transferring the alarm information again to the audio processing unit from the first portion of the alarm information that has been outputted in utterance when the operation is performed if the operation of the operation unit is performed.

According to a third aspect of the present invention, a road traffic information providing device of the present invention is a road traffic information providing device that receives alarm information from a roadside apparatus installed on or near a road that a vehicle travels or a parking lot through wireless communication and that outputs the alarm information, the road traffic information providing device comprising: a communication unit that receives the alarm information from the roadside apparatus at timing at which a link is set up with the roadside apparatus; a storage unit that stores the alarm information; an audio processing unit that converts the alarm information into speech information to output the speech information in utterance; an operation unit that controls the utterance output as needed; and alarm information transfer means for reading out the alarm information stored in the storage unit according to the priority to transfer the alarm information to the audio processing unit if the operation of the operation unit is performed and for transmitting an utterance output stop signal to the audio processing unit and then transferring the alarm information again to the audio processing unit from the first portion of the alarm information that has been outputted in utterance when the operation is performed if the operation of the operation unit is performed.

Furthermore, in the road traffic information providing device of the present invention, if the communication unit does not receive disaster information as one of the alarm information from another roadside apparatus when the predetermined operation is performed by the operation unit, the alarm information transfer means executes a process of transmitting the utterance output stop signal to the audio processing unit and then transferring the alarm information again to the audio processing unit from the first portion of the alarm information that has been outputted in utterance when the operation is performed.

Furthermore, in the road traffic information providing device of the present invention, if the predetermined operation is performed in the operation unit after a predetermined time has passed after the termination of the utterance output of all the alarm information stored in the storage unit, the alarm information transfer means executes a process of reading out the alarm information excluding safe driving support information as one of the alarm information from all the alarm information stored in the storage unit according to the priority and transferring the alarm information to the audio processing unit.

Furthermore, in the road traffic information providing device of the present invention, if safe driving support information not outputted in utterance is stored in the storage unit when the predetermined operation is performed in the operation unit while predetermined alarm information is being outputted in utterance according to the priority, the alarm information transfer means executes a process of transmitting the utterance output stop signal to the audio processing unit, transferring the safe driving support information to the audio processing unit, and then transferring the interrupted alarm information to the audio processing unit from the top.

Furthermore, in the road traffic information providing device of the present invention, if disaster information and/or safe driving support information is received from another roadside apparatus when the predetermined operation is performed in the operation unit while predetermined alarm information is being outputted in utterance according to the priority, the alarm information transfer means executes a process of transmitting the utterance output stop signal to the audio processing unit, transferring the disaster information and/or the safe driving support information to the audio processing unit, and then transferring the interrupted alarm information to the audio processing unit from the top.

According to a fourth aspect of the present invention, a road traffic information providing system of the present invention comprises: a roadside apparatus that is installed on or near a road that a vehicle travels or a parking lot and that transmits alarm information through wireless communication; a vehicle-mounted device that receives the alarm information from the roadside apparatus through the wireless communication and that is mounted on the vehicle that outputs the alarm information; and an administration server that communicates various information with the roadside apparatus, wherein the vehicle-mounted device comprises: a predetermined operation unit; and a control unit, and the control unit controls to output the alarm information supplied by the roadside apparatus in utterance again from the top by speech based on a predetermined operation of the operation unit.

According to a fifth aspect of the present invention, a road traffic information providing method of the present invention is a road traffic information providing method of receiving, by a road traffic information providing device, alarm information from a roadside apparatus installed on or near a road that a vehicle travels or a parking lot through wireless communication and of outputting the alarm information, the road traffic information providing method comprising: a reception step of receiving the alarm information from the roadside apparatus at timing at which a link is set up between the road traffic information providing device and the roadside apparatus; a storage step of storing the alarm information; an audio processing step of converting the alarm information into speech information to output the speech information in utterance; an operation step of controlling the utterance output as needed; and an alarm information transfer step of reading out the stored alarm information according to the priority of the alarm information and outputting the alarm information in utterance if the operation is not performed and of outputting the alarm information in utterance again from the first portion of the alarm information that has been outputted in utterance when the operation is performed if the operation is performed.

According to a sixth aspect of the present invention, a road traffic information providing program of the present invention causes a computer to function as: a communication unit that receives alarm information from a roadside apparatus at timing at which a link is set up between a road traffic information providing device and the roadside apparatus; a storage unit that stores the alarm information; an audio processing unit that converts the alarm information into speech information to output the speech information in utterance; an operation unit that controls the utterance output as needed; and alarm information transfer means for reading out the alarm information stored in the storage unit according to the priority of the alarm information to transfer the alarm information to the audio processing unit if the operation of the operation unit is not performed and for transmitting an utterance output stop signal to the audio processing unit to transfer the alarm information again to the audio processing unit from the first portion of the alarm information that has been outputted in utterance when the operation is performed if the operation of the operation unit is performed.

Effect of the Invention

According to the present invention, alarm information can be confirmed (outputted) again with a simple method.

BRIEF DESCRIPTION OF THE DRAWINGS

FIG. 10 shows another example of a processing procedure executed by the road traffic information providing system of FIG. 1 and is a flow chart for explaining an example of a processing procedure (operation), in which when the cancellation button is pushed down when the utterance type vehicle-mounted device outputs high-priority alarm information in utterance, general traffic information is not outputted in utterance from then on; and FIG. 11 is a diagram showing an example of information (data) transmitted from the roadside apparatus to the utterance type vehicle-mounted vehicle.

Figure 1:
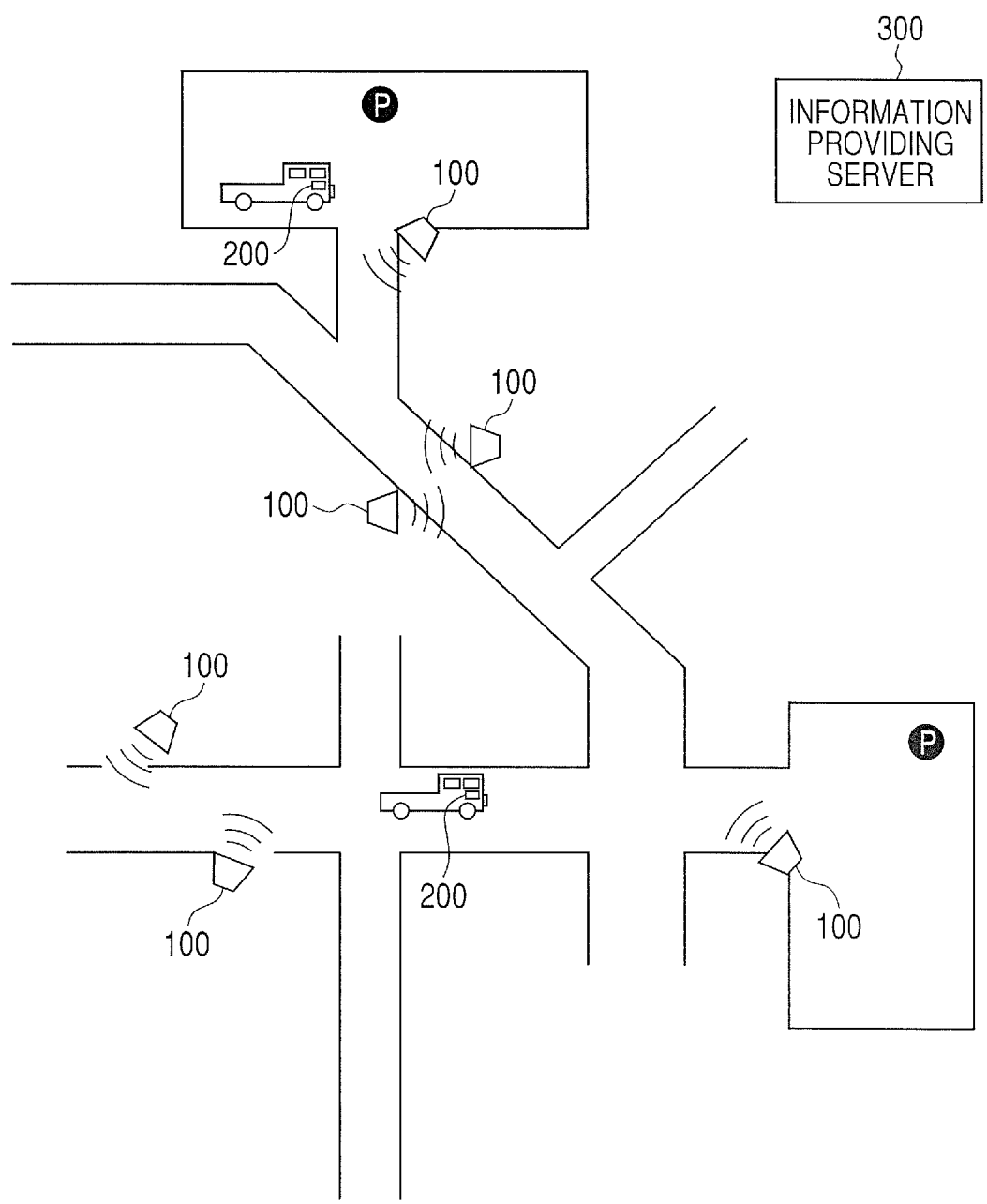
FIG. 1 is a diagram for explaining an overall configuration of a road traffic information providing system according to an embodiment of the present invention.

DESCRIPTION OF SYMBOLS 100 roadside apparatus
101 wireless communication unit for vehicle-mounted device
102 communication control unit for server
103 storage device
104 control unit
200 utterance type vehicle-mounted device (utterance-type road traffic information providing device)
201 communication unit
201a DSRC module
202 audio processing unit
204 operation unit
206 storage unit (vehicle-mounted device ID storage means)
207 control unit
222 loudspeaker
300 information providing server (administration server)
303 general network communication control unit
304 communication control unit for roadside apparatus
305 storage device
306 control unit
400 main body of utterance type vehicle device
401 re-utterance button
402 SKIP button
403 cancellation button
NW1 general communication network
NW2 ITS communication network

BEST MODES FOR CARRYING OUT THE INVENTION

Hereinafter, a road traffic information providing system according to an embodiment of the present invention will be described, taking an ITS (Intelligent Transport Systems) system as an example. In the present embodiment, although an utterance type vehicle-mounted device (apparatus that cannot acquire position information data and direction data of the vehicle) not connected to a navigation apparatus (including a portable-type simple navigation apparatus) will be described as an example, it is obvious that the present embodiment can be also applied to an utterance type vehicle-mounted device connected to a portable-type simple navigation apparatus and the like, an ITS vehicle-mounted device connected to the navigation apparatus, and the like.

As shown in FIG. 1, the ITS system comprises roadside apparatuses 100 arranged near locations, such as a road and a parking lot where a vehicle travels, an utterance type vehicle-mounted device 200 as an utterance-type road traffic information providing device mounted on the vehicle, and an information providing server (administration server) 300 that transmits/receives information to and from the roadside apparatuses 100. The roadside apparatuses 100 may be installed specially for the utterance type vehicle-mounted device 200 or may also be installed both for the ITS vehicle-mounted device and the utterance type vehicle-mounted device 200 to also serve as navigation apparatuses.

The utterance type vehicle-mounted device 200 is an utterance-type road traffic information providing device that performs communication at timing at which a link is set up with the roadside apparatus 100 (when in the communication range of the roadside apparatus 100) to provide road traffic information (alarm information) or the like to the passenger of the vehicle and that transmits an utterance type vehicle-mounted device ID (also simply called vehicle-mounted device ID: details will be described below), which is a type of vehicle ID, and the like to the roadside apparatus 100. The information providing server 300 generates various information and supplies the information to the roadside apparatuses 100.

Each roadside apparatus 100 shown in FIG. 1 is constituted by a so-called radio wave beacon, a light beacon, and the like, is arranged near the road, at a parking lot, or the like, transmits (downlinks) alarm information to the utterance type vehicle-mounted device 200 mounted on the vehicle passing nearby (within the communication range of the roadside apparatus 100: several meters to 30 meters) by the DSRC (Dedicated Short Range Communication) system in the traffic information distribution or the like, receives transmission data (uplink data: such as vehicle-mounted device ID) from the utterance type vehicle-mounted device 200, and supplies the data to the information providing server 300.

Each roadside apparatus 100 wirelessly transmits alarm information (intermediate language for TTS: described in detail below), which is data transmitted from the information providing server 300 and which is to be transmitted to the utterance type vehicle-mounted device 200, to the utterance type vehicle-mounted device 200.

Figure 2:
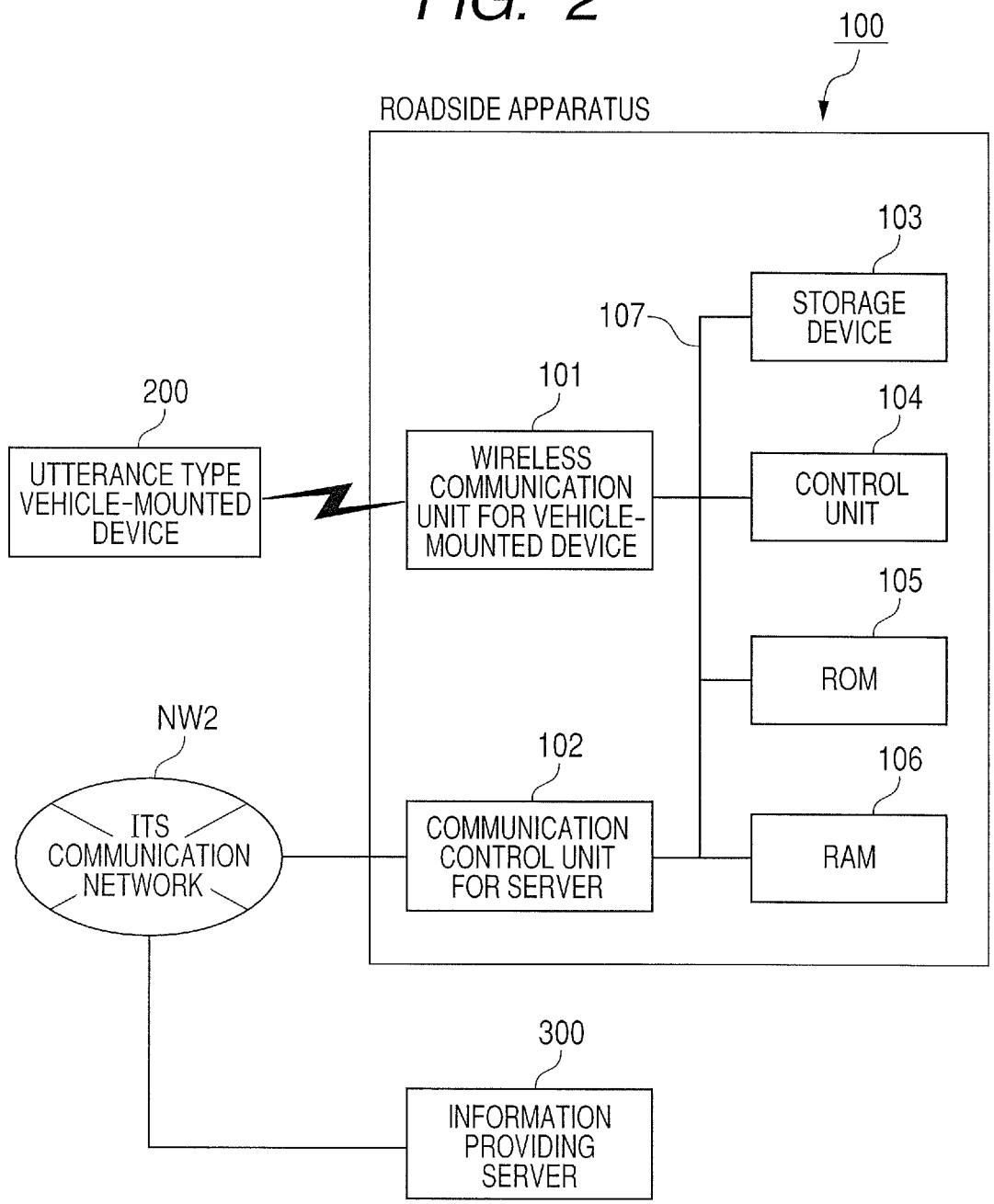
FIG. 2 is a diagram showing an example of configuration of a roadside apparatus used in the road traffic information providing system shown in FIG. 1.

To attain such functions, as shown in FIG. 2, the roadside apparatus 100 comprises a wireless communication unit for vehicle-mounted device 101 as transmission/reception means for the vehicle-mounted device, a communication control unit for server 102 as communication control means for server (including transmission/reception function), a storage device 103, a control unit 104, a ROM (Read Only Memory) 105, a RAM (Random Access Memory) 106, and a system bus 107.

The wireless communication unit for vehicle-mounted device 101 transfers information to and from the utterance type vehicle-mounted device 200 installed on the vehicle passing nearby (within the communication range of the roadside apparatus 100) by one or a plurality of wireless signals, such as a radio wave signal and a light signal. For example, when the information providing server 300 outputs alarm information, the wireless communication unit for vehicle-mounted device 101 transmits the alarm information (including roadside apparatus ID) to the utterance type vehicle-mounted device 200. Furthermore, the wireless communication unit for vehicle-mounted device 101 receives information, such as vehicle-mounted device ID, transmitted from the utterance type vehicle-mounted device 200.

The vehicle-mounted device ID is an ID set for each vehicle-mounted device, and a certification organization registers the ID in association with the vehicle. Thus, the vehicle-mounted device ID is a type of ID for identifying the vehicle. Therefore, personal information can be acquired from the vehicle-mounted device ID.

The communication control unit for server 102 is connected to the information providing server 300 through an ITS communication network NW2 and controls to receive alarm information, such as traffic information, transmitted from the information providing server 300 and reserve the alarm information in the storage device 103. The communication control unit for server 102 also controls to provide the traffic information, the vehicle-mounted device ID, and the like acquired by the roadside apparatus 100 to the information providing server 300.

The storage device 103 stores traffic information received from the information providing server 300 and traffic information, vehicle-mounted device ID, and the like specific to the roadside apparatus 100. The storage device 103 also stores information uplinked from the utterance type vehicle-mounted device 200.

The control unit 104 is constituted by a processor and the like and controls the operation of the entire roadside apparatus 100. Particularly, the control unit 104 controls to transmit the traffic information stored in the storage device 103 from the wireless communication unit for vehicle-mounted device 101 and controls to store the information (such as vehicle-mounted device ID) acquired from the utterance type vehicle-mounted device 200 through the wireless communication unit for vehicle-mounted device 101 in the storage device 103.

The control unit 104 also controls to transmit the traffic information and the like stored in the storage device 103 and acquired by the roadside apparatus 100 to the information providing server 300 through the communication control unit for server 102 and the ITS communication network NW2 and to store the information (such as traffic information) acquired from the information providing server 300 through the communication control unit for server 102 in the storage device 103.

The control unit 104 also acquires the information (such as vehicle-mounted device ID) uplinked from the utterance type vehicle-mounted device 200 through the wireless communication unit for vehicle-mounted device 101 and stores the information in the storage device 103.

The ROM 105 stores an operating system (OS), an operation program, and various data necessary for the operational control of the entire roadside apparatus 100. The RAM 106 functions as a work area of the control unit 104.

The system bus 107 is a transmission path for transferring commands and data between the components.

Figure 3:
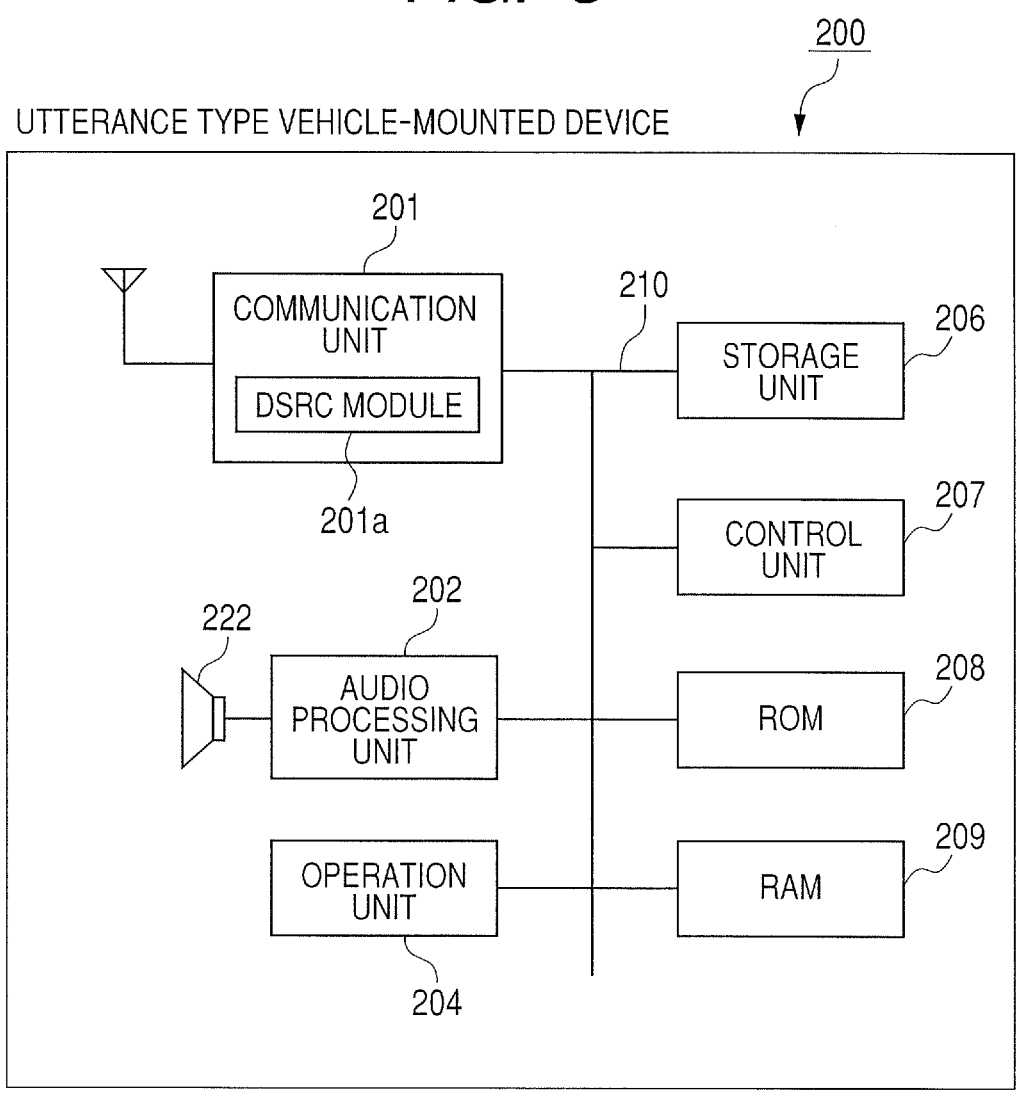
FIG. 3 is a diagram for explaining a configuration of an utterance type vehicle-mounted device used in the road traffic information providing system shown in FIG. 1.

The utterance type vehicle-mounted device 200 shown in FIG. 3 is installed on the vehicle and has a function of reproducing the alarm information (such as traffic information: intermediate language for TTS) transmitted from the roadside apparatus 100 to alarm (output in utterance) the user. The utterance type vehicle-mounted device 200 also notifies (uplinks) the roadside apparatus 100 of the vehicle-mounted device ID, and the like.

As shown in FIG. 3, the utterance type vehicle-mounted device 200 comprises a communication unit 201, an audio processing unit 202, an operation unit 204, a storage unit 206, a control unit 207, a ROM 208, a RAM 209, a system bus 210, and a loudspeaker 222.

The communication unit 201 at least includes a DSRC module 201a.

The DSRC module 201a communicates with the roadside apparatus 100 by the DSRC system and receives the alarm information supplied (downlinked) from the roadside apparatus 100. The received alarm information is stored in the storage unit 206.

The audio processing unit 202 converts the alarm information made of a TTS (Text To Speech) intermediate language (text data for speech synthesis: including information of intonation and the like) inputted by the storage unit 206 through the control unit 207 into an analog audio signal and outputs the signal to the loudspeaker 222. This allows the user to listen to the alarm information (TTS intermediate language) acquired from the roadside apparatus 100 as speech data (utterance output).

When an utterance output stop signal (such as a reset signal) is received from the control unit 207, the audio processing unit 202 returns a control unit, a memory, and the like inside the apparatus to initial states. This allows the control unit 207 to instantaneously stop the utterance output from the audio processing unit 202 without generating a time lag. Other than the loudspeaker 222 included in the utterance type vehicle-mounted device 200, the alarm information (speech data) may be outputted from the audio system mounted on the vehicle.

Figure 4:
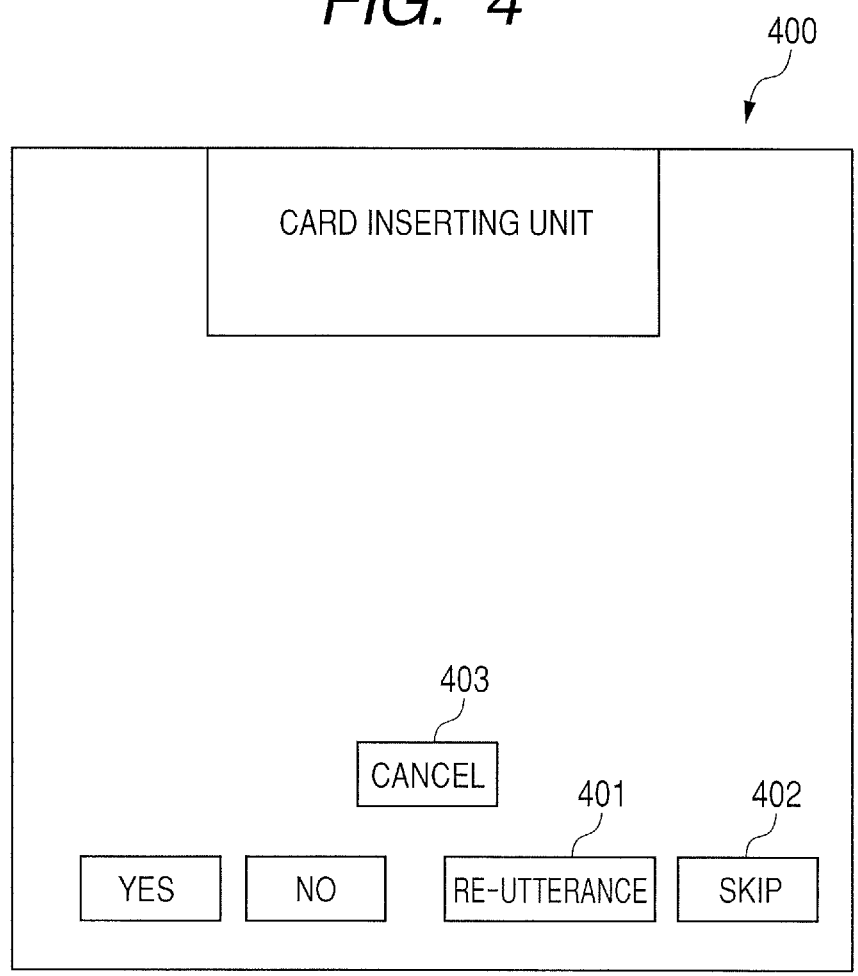
FIG. 4 is a diagram showing an example of an overview of the utterance type vehicle-mounted device shown in FIG. 3.

As shown in FIG. 4, the operation unit 204 is constituted by, for example, a re-utterance button 401, a SKIP button 402, and a cancellation button 403 arranged on a main body 400 of the utterance type vehicle-mounted device 200. The operation unit 204 generates an instruction input signal based on instruction input by the user and inputs the signal to the control unit 207.

The storage unit 206 that is a storage unit of the alarm information supplied (downlinked) from the roadside apparatus 100 and that is an ID storage unit storing a predetermined ID of the roadside apparatus 100 includes a hard disk drive (HDD) and stores various setting information, and the like.

The storage unit 206 also stores in advance the vehicle-mounted device ID (utterance type vehicle-mounted device ID) for identifying the vehicle. The vehicle-mounted device ID is an ID for identifying the vehicle put on the header part of packets transmitted/received for establishing a link between the roadside apparatus 100 and the utterance type vehicle-mounted device 200, packets in the case of the utterance type vehicle-mounted device 200 uplinking the data (such as vehicle-mounted device ID) to the roadside apparatus 100, packets in the case of the roadside apparatus 100 downlinking the data (such as alarm information) to the utterance type vehicle-mounted device 200, or the like.

The control unit 207 is constituted by a CPU (Central Processing Unit) and controls the operation of the entire utterance type vehicle-mounted device 200.

For example, at timing at which a link is set up between the utterance type vehicle-mounted device 200 and the roadside apparatus 100, i.e. when the vehicle-mounted device 200 is positioned in the communication area of the roadside apparatus 100, the control unit 207 as alarm information transfer means controls the communication unit 201 (DSRC module 201a) to read out the vehicle-mounted device ID and the like stored in the storage unit 206 and transmits (uplinks) the vehicle-mounted device ID and the like to the roadside apparatus 100.

Furthermore, when a link is set up between the communication unit 201 (DSRC module 201a) and the wireless communication unit for vehicle-mounted device 101 of the roadside apparatus 100, the control unit 207 receives (downlinks) the alarm information (intermediate language for TTS: including roadside apparatus ID) from the roadside apparatus 100 through the DSRC module 201a, stores the information in the storage unit 206, reads out the alarm information stored in the storage unit 206 in a predetermined procedure based on an instruction input signal from the operation unit 204, and transfers the information to the audio processing unit 202. Furthermore, the control unit 207 can transmit an utterance output stop signal (such as a reset signal) to the audio processing unit 202 to instantaneously stop the utterance output of the audio processing unit 202 (without generating a time lag). The control unit 207 may comprise a co-processor and the like.

Furthermore, when a link is set up between the communication unit 201 communication unit 201 (DSRC module 201a) and the wireless communication unit for vehicle-mounted device 101 of the roadside apparatus 100, the control unit 207 reads out the vehicle-mounted device ID and the like stored in the storage unit 206 and transmits (uplinks) the vehicle-mounted device ID and the like to the wireless communication unit for vehicle-mounted device 101 of the roadside apparatus 100 through the communication unit 201 (DSRC module 201a).

The ROM 208 records a program of an operating system (OS), an operation program, and various data necessary for the operational control of the entire utterance type vehicle-mounted device 200.

The RAM 209 is for temporary storage of the data and programs and temporarily holds the data (alarm information) and the like acquired by the communication unit 201. The control unit 207 also uses the RAM 209 as a work memory.

The system bus 210 is a transmission path for interconnecting the components and transferring commands and data.

The information providing server 300 is an apparatus that generates and distributes traffic information, which is the same or different in each of the plurality of roadside apparatuses 100, and that receives the vehicle-mounted device ID and the like transmitted from the roadside apparatus 100.

Figure 5:
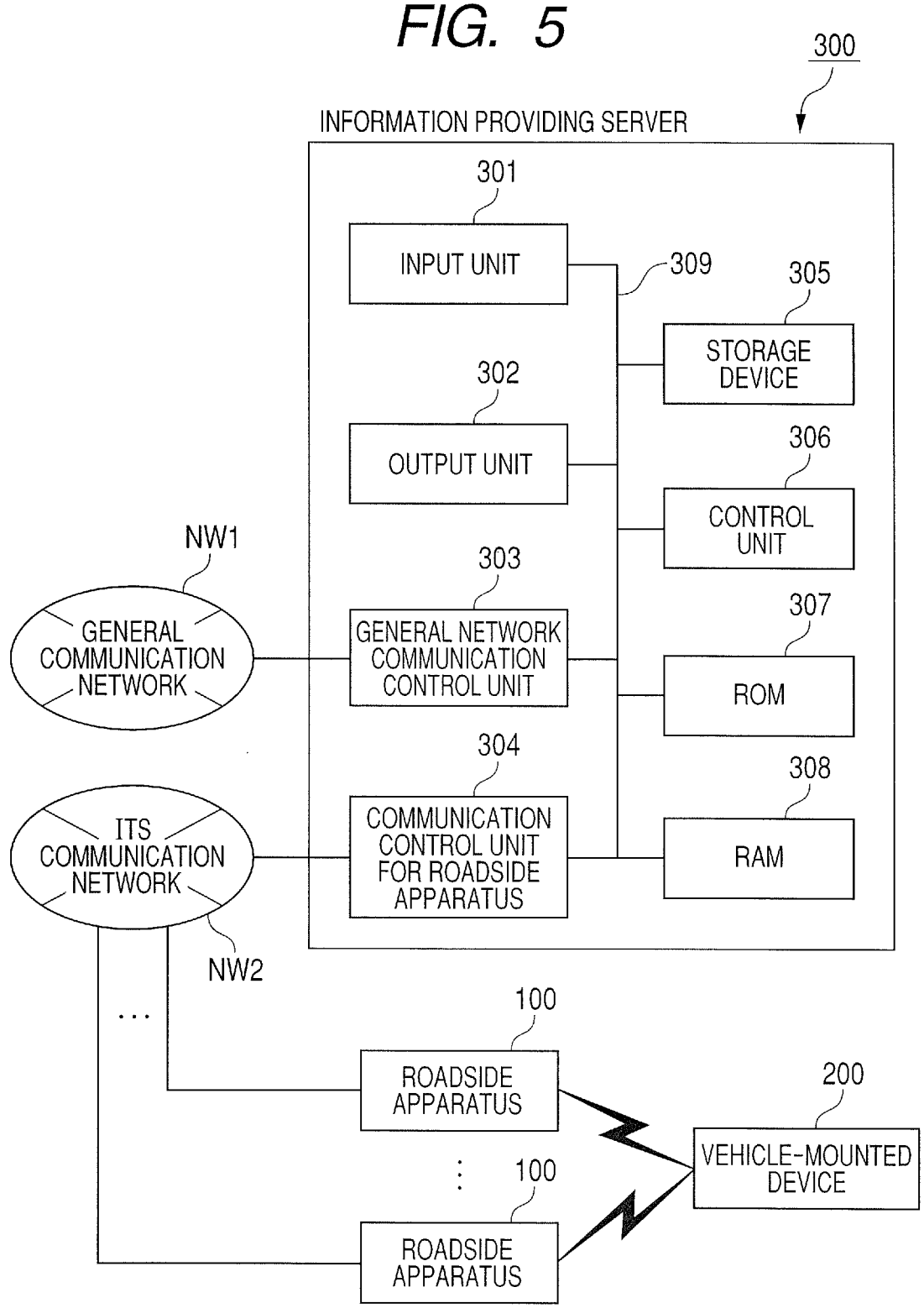
FIG. 5 is a diagram for explaining a configuration of an information providing server (administration server) used in the road traffic information providing system shown in FIG. 1.

As shown in FIG. 5, the information providing server 300 comprises an input unit 301, an output unit 302, a general network communication control unit 303, a communication control unit for roadside apparatus 304, a storage device 305, a control unit 306, a ROM 307, a RAM 308, and a system bus 309.

The input unit 301 comprises one or a plurality of keyboard, mouse, input interface, and the like and inputs various data and instructions.

The output unit 302 is constituted by a display unit and the like and displays data, messages, and the like.

The general network communication control unit 303 communicates with an external apparatus through the general communication network NW1, such as a telephone line and the Internet, to acquire various information. The information providing server 300 may be divided into, for example, a regional server and a central server. According to the classification, the regional server edits the road conditions, such as peak detour, near tunnel, near curve, point of sudden weather change in mountain area, and road surface freezing point, at the sites near the trouble occurrence points to set alarm information and provides the alarm information to the vehicle (vehicle-mounted device).

The communication control unit for roadside apparatus 304 is connected to a plurality of roadside apparatuses 100 through the ITS communication network NW2, transmits the traffic information to the roadside apparatuses 100, and receives the vehicle-mounted device ID and the like transmitted from the roadside apparatus 100.

The storage device 305 comprises storage means, such as a hard disk device, and stores various traffic information, the vehicle-mounted device IDs obtained by roadside apparatuses 100 through the communication with the utterance type vehicle-mounted device 200, and the like. The storage device 305 also stores position information (latitude, longitude, and the like), addresses, and the like of the roadside apparatuses 100 as well as nearby geographic information.

The control unit 306 is constituted by a processor and the like and controls the operation of the entire information providing server 300. The control unit 306 also creates information to be distributed from the roadside apparatus 100 for each roadside apparatus 100 based on various information stored in the storage device 305 and supplies the information to each roadside apparatus 100 through the communication control unit for roadside apparatus 304 and the ITS communication network NW2.

The ROM 307 stores an operating system (OS), an operation program, and various data necessary for the operational control of the entire information providing server 300. The RAM 308 functions as a work area of the control unit 306. The system bus 309 is a transmission path for transferring commands and data between the components.

FIG. 11 shows an example of information (data) transmitted from the roadside apparatus 100 to the utterance type vehicle-mounted device 200.

Next, a basic operation in the utterance-type road traffic information providing device (system) according to the present embodiment will be described. In the present embodiment, to simplify the description, three examples of the alarm information are described: (1) general traffic information including long sentences such as highway radio; (2) disaster information for notifying an earthquake and the like; and (3) safe driving support information for notifying merge warning information, a sudden accident, and the like. Although the priority of alarming is in the order of disaster information→safe driving support information→general traffic information in the description, the order is not limited to this.

Figure 6:
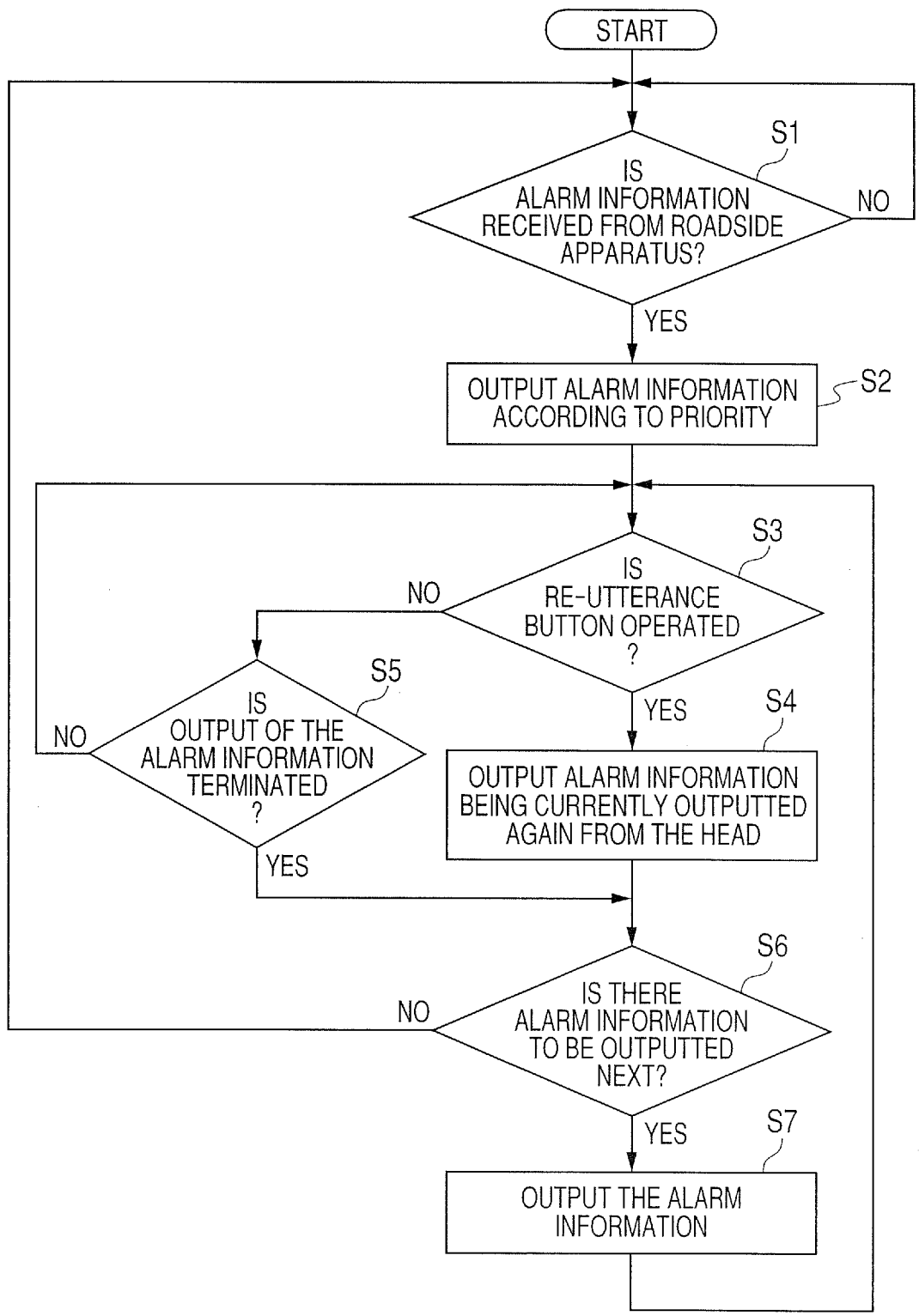
FIG. 6 shows an example of a processing procedure executed by the road traffic information providing system of FIG. 1 and is a flow chart for explaining an example of a processing procedure (operation) when a re-utterance button is pushed down when the utterance type vehicle-mounted device receives alarm information from the roadside apparatus and outputs the information in utterance according to the priority of the information.

First, an operation of the utterance-type road traffic information providing device (system) when a re-utterance button 401 is operated (pushed down) when the utterance type vehicle-mounted device 200 receives the alarm information from the roadside apparatus 100 and outputs the information in utterance according to the priority of the information will be described with reference to a flow chart of FIG. 6.

First, the control unit 207 of the utterance type vehicle-mounted device 200 determines whether the alarm information is received from the roadside apparatus 100 (step S1). If the reception is not confirmed, step S1 is executed again after a predetermined time. If the reception is detected, the process moves to step S2.

After the transition to step S2, the control unit 207 outputs the information in utterance according to the priority of the received information and moves the process to step S3.

After the transition to step S3, the control unit 207 determines whether an operation of the operation unit 204 (push down of the re-utterance button 401) is performed. If the control unit 207 determines that the operation is performed, the control unit 207 moves the process to step S4, outputs an utterance output stop signal to the audio processing unit 202, reads out the alarm information (alarm information outputted in utterance when the operation unit is operated) from the storage unit 206 from the head, transfers (re-utterance) the alarm information to the audio processing unit 202, and moves the process to step S6.

After the transition to step S6, the control unit 207 determines whether there is alarm information to be outputted in utterance next. If the control unit 207 determines that there is no alarm information to be outputted in utterance next, the control unit 207 returns the process to step S1 and waits for the reception of the next alarm information from the roadside apparatus 100. On the other hand, if the control unit 207 determines that there is alarm information to be outputted in utterance next, the control unit 207 moves the process to step S7, starts outputting the alarm information in utterance, and returns the process to step S3.

On the other hand, if the control unit 207 determines in step S3 that the operation of the operation unit is not performed, the control unit moves the process to step S5 and determines whether the utterance output of the alarm information is terminated. If the control unit 207 determines that the utterance output is not terminated, the control unit 207 returns the process to step S3. If the control unit 207 determines that the utterance output is terminated, the control unit 207 moves the process to step S6.

The control unit 207 continues the foregoing processes (steps S1 to S7) until the power of the utterance type vehicle-mounted device 200 is turned off.

Figure 7:
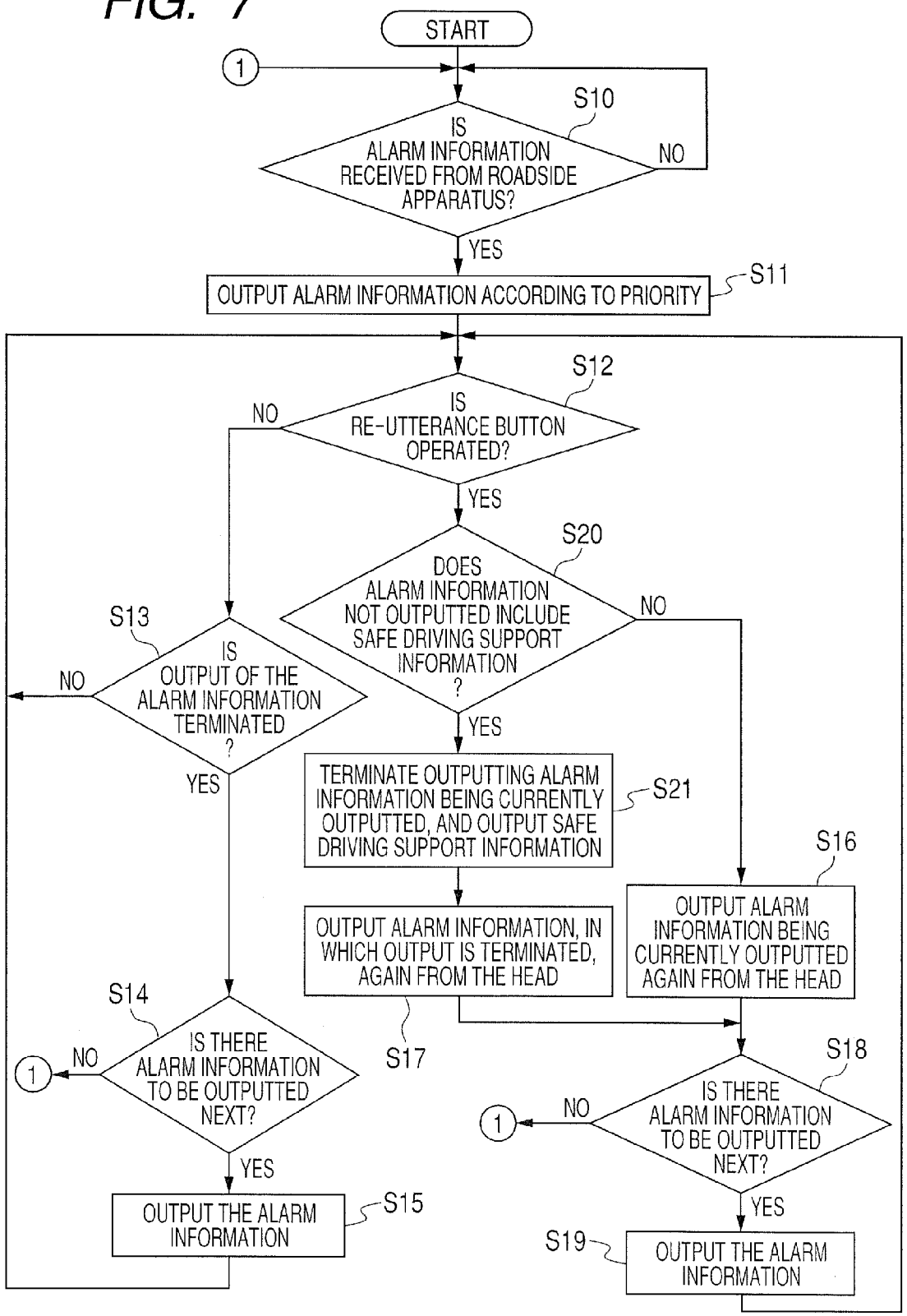
FIG. 7 shows another example of a processing procedure executed by the road traffic information providing system of FIG. 1 and is a flow chart for explaining an example of a processing procedure (operation) when the re-utterance button is operated when the utterance type vehicle-mounted device receives the alarm information from the roadside apparatus and outputs the alarm information in utterance according to the priority of the alarm information, and when safe driving support information, which is not outputted in utterance, is stored in a storage unit.

Next, an operation of the utterance-type road traffic information providing device (system) when the re-utterance button 401 is operated (pushed down) when the utterance type vehicle-mounted device 200 receives the alarm information from the roadside apparatus 100 and outputs the alarm information in utterance according to the priority of the alarm information, and when the safe driving support information, which is not outputted in utterance, is stored in the storage unit 206 will be described with reference to a flow chart of FIG. 7.

First, the control unit 207 of the utterance type vehicle-mounted device 200 determines whether the alarm information is received from the roadside apparatus 100 (step S10). If the reception is not confirmed, the control unit 207 executes step S10 again after a predetermined time. If the reception is detected, the control unit 207 moves the process to step S11.

After the transition to step S11, the control unit 207 outputs the information in utterance according to the priority of the received information and moves the process to step S12.

After the transition to step S12, the control unit 207 determines whether an operation of the operation unit 204 (push down of the re-utterance button 401) is performed. If the control unit 207 determines that the operation is not performed, the control unit 207 moves the process to step S13.

After the transition to step S13, the control unit 207 determines whether the utterance output of the alarm information is terminated. If the control unit 207 determines that the utterance output is not terminated, the control unit 207 returns the process to step S12. If the control unit determines that the utterance output is terminated, the control unit moves the process to step S14.

After the transition to step S14, the control unit 207 determines whether there is alarm information to be outputted in utterance next. The control unit 207 returns the process to step S10 if there is no alarm information and moves the process to step S15 if there is alarm information.

After the transition to step S15, the control unit 207 starts outputting the alarm information in utterance and returns the process to step S12.

On the other hand, if the control unit 207 determines in step S12 described above that the operation of the operation unit 204 (push down of the re-utterance button 401) is performed, the control unit 207 moves the process to step S20.

After the transition to step S20, the control unit 207 determines whether safe driving support information is included in the alarm information that is stored in the storage unit 206 and that is not outputted in utterance yet. If the control unit 207 determines that the safe driving support information is not included, the control unit 207 moves the process to step S16.

After the transition to step S16, the control unit 207 outputs an utterance output stop signal to the audio processing unit 202, reads out the information, which is being currently outputted in utterance (alarm information outputted in utterance when the operation unit is operated), from the storage unit 206 from the head, and transfers (re-utterance) the information to the audio processing unit 202. The audio processing unit 202 outputs the transferred alarm information in utterance (re-utterance) and moves the process to step S18.

After the transition to step S18, the control unit 207 determines whether there is alarm information to be outputted in utterance next. The control unit 207 returns the process to step S10 if there is no alarm information and moves the process to step S19 if there is alarm information.

After the transition to step S19, the control unit 207 starts outputting the alarm information in utterance and returns the process to step S12.

On the other hand, if the control unit 207 determines in step S20 described above that the safe driving support information is included, the control unit 207 moves the process to step S21.

After the transition to step S21, the control unit 207 stops outputting the alarm information being currently outputted in utterance (outputs an utterance output stop signal to the audio processing unit 202), reads out the safe driving support information stored in the storage unit 206 from the head, and transfers the information to the audio processing unit 202. The audio processing unit 202 outputs the transferred safe driving support information in utterance and moves the process to step S17.

After the transition to step S17, the control unit 207 reads out the alarm information, which is stopped being outputted in utterance in step S21 described above, from the storage unit 206 from the head and transfers the alarm information to the audio processing unit 202. The audio processing unit 202 outputs the transferred alarm information in utterance (re-utterance) and moves the process to step S18.

The control unit 207 continues the foregoing processes (steps S10 to S21) until the power of the utterance type vehicle-mounted device 200 is turned off.

Figure 8:
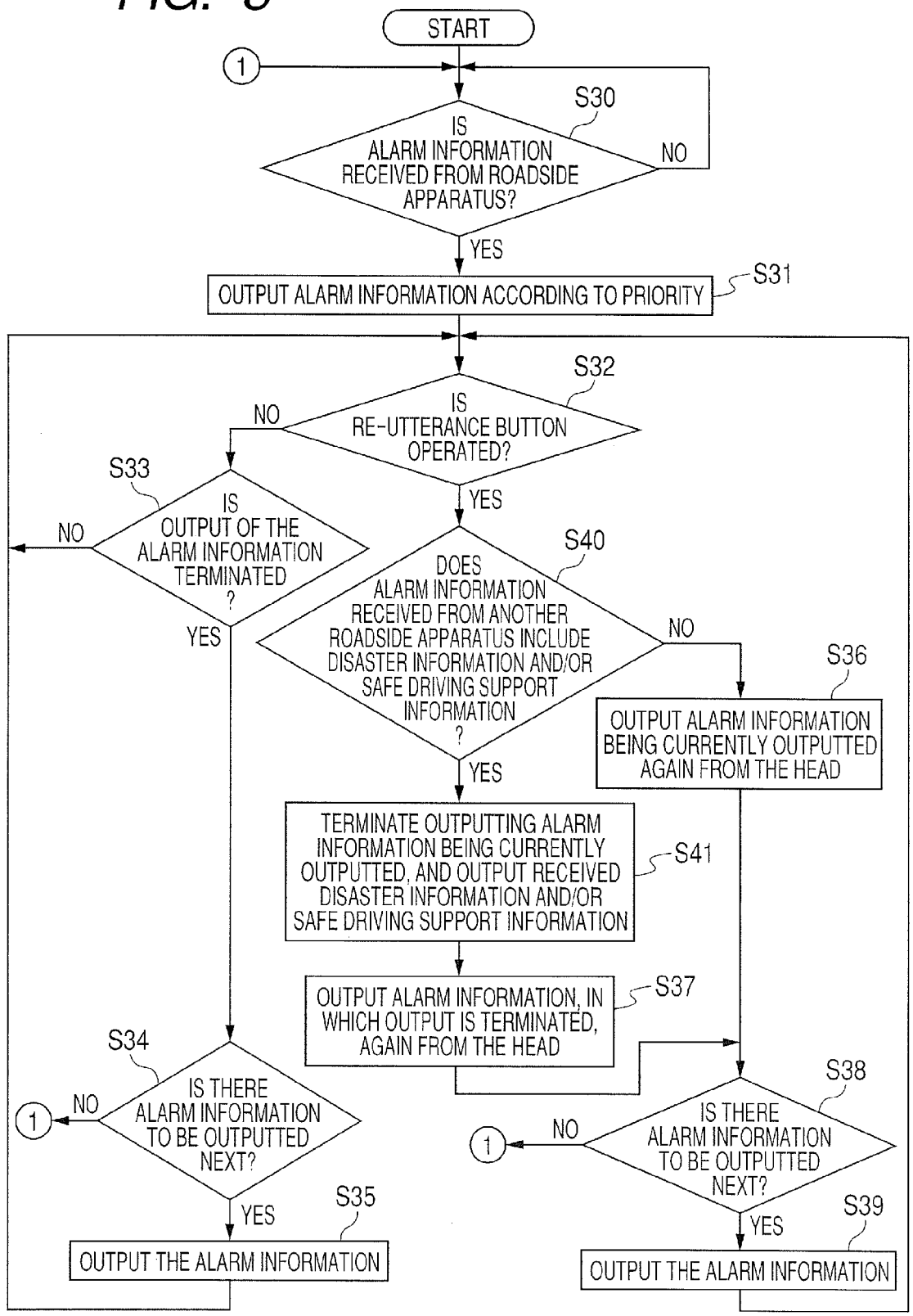
FIG. 8 shows another example of a processing procedure executed by the road traffic information providing system of FIG. 1 and is a flow chart for explaining an example of a processing procedure (operation) when the re-utterance button is operated when the utterance type vehicle-mounted device receives the alarm information from the roadside apparatus and outputs the alarm information in utterance according to the priority of the alarm information, and when another roadside apparatus receives disaster information and/or safe driving support information.

Next, an operation of the utterance-type road traffic information providing device (system) when the re-utterance button 401 is operated (pushed down) when the utterance type vehicle-mounted device 200 receives the alarm information from the roadside apparatus 100 and outputs the alarm information in utterance according to the priority of the alarm information, and when disaster information and/or safe driving support information is received from another roadside apparatus 100 will be described with reference to a flow chart of FIG. 8. Processes of steps S30 to S39 in the flow chart of FIG. 8 are the same as the processes of steps S10 to S19 in the flow chart of FIG. 7, and the description will not be repeated.

In step S32, the control unit 207 determines whether the operation of the operation unit 204 (push down of the re-utterance button 401) is performed. If the control unit 207 determines that the operation is performed, the control unit 207 moves the process to step S40 and determines whether the alarm information received from another roadside apparatus 100 includes disaster information and/or safe driving support information. If the control unit 207 determines that the information is not included, the control unit 207 moves the process to step S36. If the control unit 207 determines that the information is included, the control unit 207 moves the process to step S41.

After the transition to step S41, the control unit 207 stops outputting the alarm information being currently outputted in utterance (outputs an utterance output stop signal to the audio processing unit 202), reads out the received disaster information and/or the safe driving support information stored in the storage unit 206 from the head, and transfers the information to the audio processing unit 202. The audio processing unit 202 outputs the transferred disaster information or the safe driving support information in utterance. After the transition to step S37, the control unit 207 reads out the alarm information, which is stopped being outputted in utterance in step S41 described above, from the storage unit 206 from the head and transfers the alarm information to the audio processing unit 202. The audio processing unit 202 outputs the transferred alarm information in utterance (re-utterance), and the process moves to step S38.

The control unit 207 continues the foregoing processes (steps S30 to S41) until the power of the utterance type vehicle-mounted device 200 is turned off.

Figure 9:
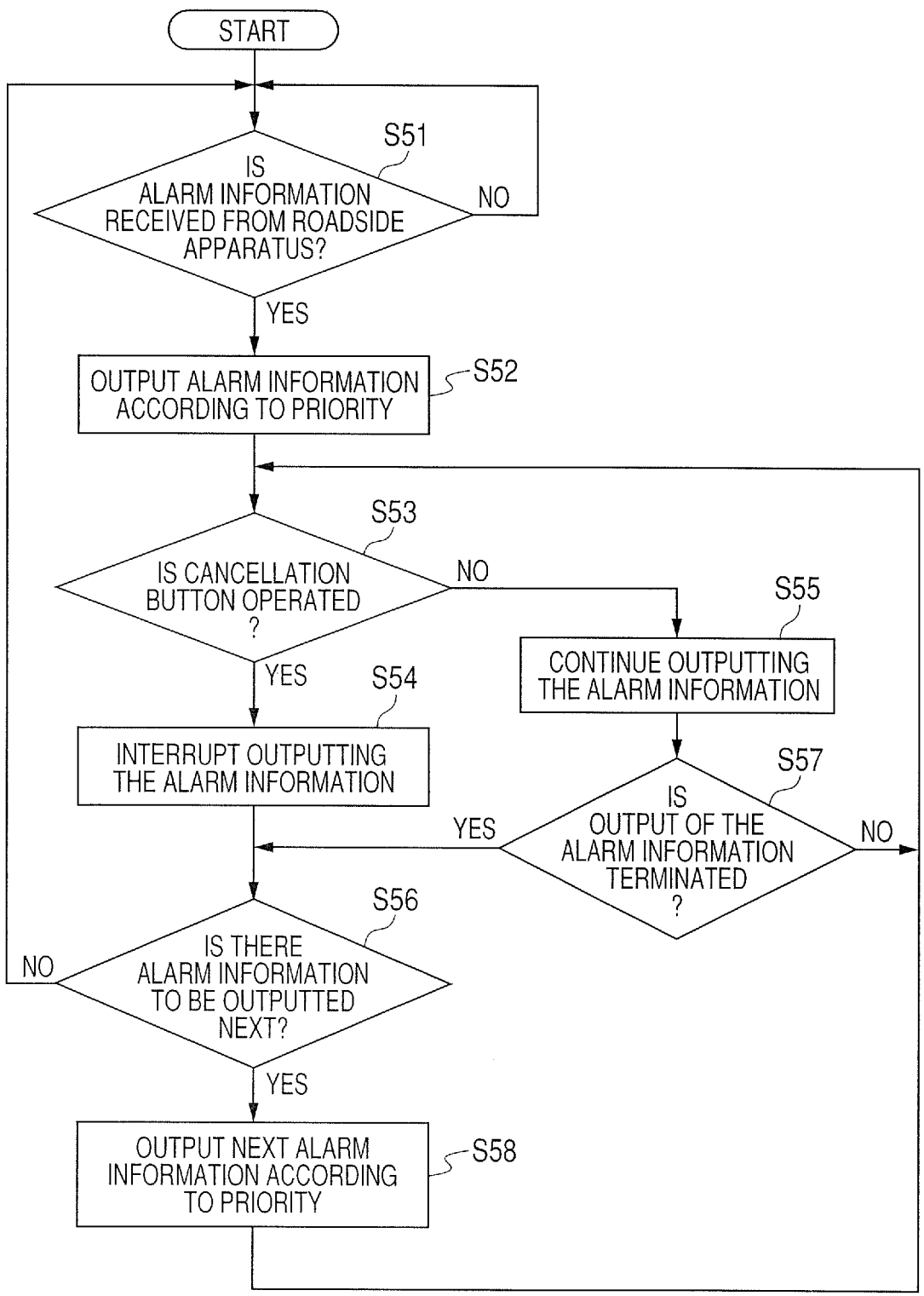
FIG. 9 shows another example of a processing procedure executed by the road traffic information providing system of FIG. 1 and is a flow chart for explaining an example of a processing procedure (operation) when a cancellation button is pushed down when the utterance type vehicle-mounted device receives the alarm information from the roadside apparatus and outputs the information in utterance according to the priority of the information.

Next, an operation of the utterance-type road traffic information providing device (system) when the cancellation button 403 is operated (pushed down) when the utterance type vehicle-mounted device 200 receives the alarm information from the roadside apparatus 100 and outputs the information in utterance according to the priority of the information will be described with reference to a flow chart of FIG. 9.

First, the control unit 207 of the utterance type vehicle-mounted device 200 determines whether the alarm information is received from the roadside apparatus 100 (step S51). If the reception is not confirmed, the control unit 207 executes step S51 again after a predetermined time. If the reception is detected, the control unit 207 moves the process to step S52.

After the transition to step S52, the control unit 207 outputs the information in utterance according to the priority of the received information and moves the process to step S53.

After the transition to step S53, the control unit 207 determines whether the operation of the operation unit (push down of the cancellation button 403) is performed. If the control unit 207 determines that the operation is performed, the control unit 207 moves the process to step S54, interrupts (outputs an utterance output stop signal to the audio processing unit 202) outputting the alarm information (alarm information outputted in utterance when the operation unit is operated) in utterance, and moves the process to step S56.

After the transition to step S56, the control unit 207 determines whether there is alarm information to be outputted in utterance next. If the control unit 207 determines that there is no alarm information to be outputted in utterance next, the control unit 207 returns the process to step S51 and waits for the reception of the next alarm information from the roadside apparatus 100. On the other hand, if the control unit 207 determines that there is alarm information to be outputted in utterance next, the control unit 207 moves the process to step S58, outputs the alarm information next in the priority in utterance, and returns the process to step S53.

On the other hand, if the control unit 207 determines in step S53 that the operation of the operation unit is not performed, the control unit 207 moves the process to step S55, continues outputting the alarm information in utterance, and moves the process to step S57.

After the transition to step S57, the control unit 207 determines whether the utterance output of the alarm information is terminated. If the control unit 207 determines that the utterance output is terminated, the control unit 207 moves the process to step S56. If the control unit 207 determines that the utterance output is not terminated, the control unit 207 returns the process to step S53.

The control unit 207 continues the foregoing processes (steps S51 to S58) until the power of the utterance type vehicle-mounted device 200 is turned off.

Figure 10:
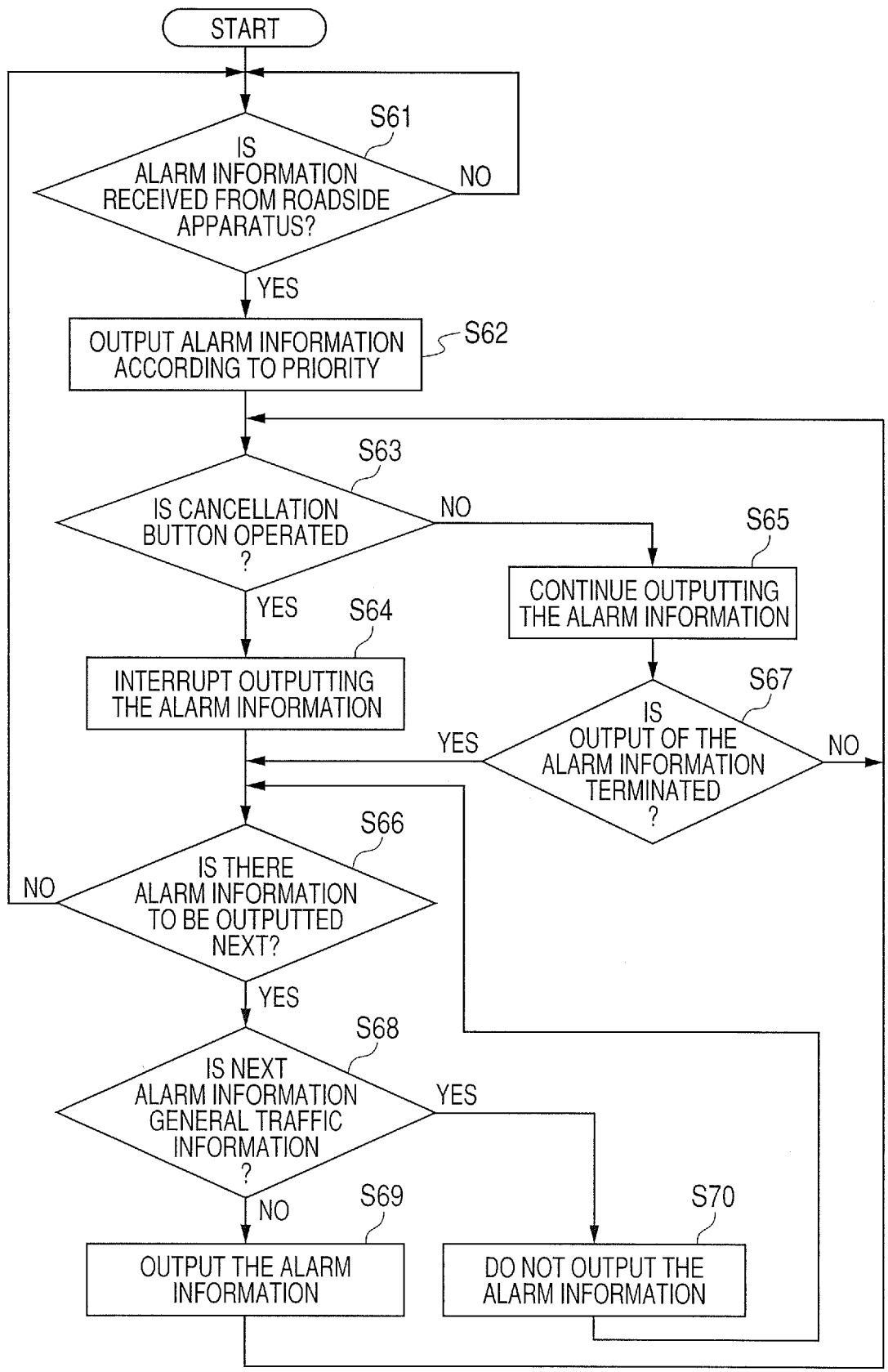

Next, the utterance-type road traffic information providing device (system) that operates not to output the general traffic information in utterance after the operation of the operation unit (push down of the cancellation button) is performed when the utterance type vehicle-mounted device 200 outputs high-priority alarm information (disaster information and safe driving support information) in utterance will be described with reference to a flow chart of FIG. 10. Processes of steps S61 to S67 in the flow chart of FIG. 10 are the same as the processes of steps S51 to S57 in the flow chart of FIG. 6, and the description will not be repeated.

If the control unit 207 determines in step S66 that there is alarm information to be outputted in utterance next, the control unit 207 determines in step S68 whether the alarm information (alarm information to be outputted in utterance next) is general traffic information. If the control unit 207 determines that the alarm information is not general traffic information, the control unit 207 moves the process to step S69, outputs the alarm information in utterance, and moves the process to step S63. On the other hand, if the control unit 207 determines in step S68 that the alarm information is general traffic information, the control unit 207 moves the process to step S70, discards the alarm information, and moves the process to step S66.

The control unit 207 continues the foregoing processes (steps S61 to S70) until the power of the utterance type vehicle-mounted device 200 is turned off.

Although the embodiment of the present invention has been described above, the present invention is not limited to this. For example, instead of the short range communication, another communication system such as midrange communication may be adopted.

Furthermore, when the re-utterance button 401 is operated during the utterance output of the alarm information, the utterance may be performed again from the head of the alarm information if disaster information is not received from other roadside apparatuses 100. Obviously, the alarm information may be outputted twice (re-utterance) regardless of the existence of the reception of the disaster information.

After the termination of the utterance output of the entire alarm information stored in the storage unit 206, if the re-utterance button 401 is operated after a predetermined time has passed, the alarm information excluding the safe driving support information as one of the alarm information from the plurality of alarm information remaining in the storage unit 206 may be outputted twice (re-utterance) according to the priority. This is because the safe driving support information is not so meaningful if the timing is missed. Alternatively, only the alarm information other than the safe driving support information outputted lastly may be outputted.

Furthermore, if the re-utterance button 401 is pushed down when predetermined alarm information is outputted in utterance according to the priority, and if safe driving support information not outputted in utterance is stored in the storage unit 206, the control unit 207 may interrupt outputting the alarm information in utterance, prioritize and output the safe driving support information in utterance, and then output the interrupted alarm information in utterance from the top. If there is safe driving support information, there is an effect of a reduction in time if the alarm information is skipped when there is a re-utterance instruction, the safe driving support information is outputted first, and then the skipped alarm information is outputted in utterance from the head.

Furthermore, if the re-utterance button 401 is pushed down when predetermined alarm information is outputted in utterance according to the priority, and if disaster information and/or safe driving support information is received from another roadside apparatus 100, the control unit 207 may interrupt the utterance output of the alarm information, prioritize and output the disaster information and/or the safe driving support information in utterance, and then output the interrupted alarm information in utterance from the top. If an instruction of re-utterance is received but the re-utterance cannot be immediately performed because other information is being outputted in utterance, an LED or the like may be additionally arranged on the apparatus (utterance type vehicle-mounted device 200), and the user may be notified of the situation by blinking the LED or the like on and off.

Furthermore, the SKIP button 402 may be arranged, which is for outputting an entire long sentence in utterance from the top when safe driving support information is received during general traffic information utterance output (during long sentence utterance), and the long sentence utterance is interrupted. Furthermore, a function may be included which is for determining a punctuation mark of the TTS intermediate language to allow the re-utterance of the interrupted long sentence utterance from the position desired by the user.

Furthermore, for example, the alarm information received lastly from the roadside apparatus 100 may be stored in the storage unit 206 to allow the user to output the alarm information in utterance again at any timing. For example, since the data size of the TTS is compact, the TTS intermediate language can be stored along with a received time stamp, and an arbitrary search later allows the utterance.

Furthermore, when a re-utterance instruction of the alarm information received from the roadside apparatus 100 is issued, if there are a plurality of alarm information after a predetermined time has passed (for example, five minutes), all alarm information may be outputted in utterance in the order of priority. Alternatively, since the safe driving support information becomes meaningless after the departure from the location, only the disaster information or the general traffic information may be outputted in utterance.

Furthermore, the utterance type vehicle-mounted device 200 may be combined with, for example, an electronic compass to determine the inbound/outbound lane, and if the alarm information is wrong (for example, alarm information for the outbound lane is received while the vehicle travels in the inbound lane), the alarm information may be discarded (for example, deleted from the storage unit 206), and only correct alarm information may be outputted when there is a re-utterance instruction.

Furthermore, the safe driving support information or other roadside apparatuses 100 may be taken into consideration to perform the re-utterance, or not only the alarm information lastly outputted, but also the lastly received data group (a plurality of data) may be able to be outputted. For example, the data (alarm information) may be able to be tracked back using the skip button 402.

Furthermore, if the re-utterance button 401 is operated when the output of the entire alarm information in utterance is terminated, the lastly outputted alarm information may be outputted, or the alarm information stored in the storage unit 206 may be sequentially outputted according to the priority. In this case, the alarm information excluding the safe driving support information may not be outputted.

Furthermore, when the cancellation button is operated during the re-utterance of the alarm information, the re-utterance of the alarm information may be canceled (not performed).

Furthermore, if the data capacity of the internal memory of the audio processing unit 202 is large, the control unit 207 may output the information stored in the memory of the audio processing unit 202 in utterance again based on the operation of the operation unit (re-utterance button) 204 after transmitting the utterance output stop signal to the audio processing unit 202 (stopping the utterance output).

Furthermore, although it is preferable to use the present embodiment in an apparatus (utterance type vehicle-mounted device 200) that cannot acquire the position information data or the direction data of the vehicle, the present embodiment can also be applied to an utterance type vehicle-mounted device connected to a portable-type simple navigation apparatus and the like and an ITS vehicle-mounted device connected to the navigation system (at least, vehicle-mounted device connected to a navigation apparatus that notifies the control unit 207 of the position information or the traveling direction information of the vehicle or incorporated into the navigation system). Although the DSRC system is used in the embodiments, another wireless system may be used. Furthermore, although the alarm information is alarmed according to the priority in the embodiments, the present invention can also be applied to information without the priority.

All or part of the functions of the configuration blocks included in the road traffic information providing system of the embodiment may be realized by software, or at least part of the functions may be realized by hardware. For example, all or part of the processes by the control units 104, 207, and 306 may be realized by one or a plurality of programs on a computer, or at least part of the processes may be realized by hardware.

Furthermore, the embodiment is only for explanation and does not limit the scope of the present invention. For example, a computer program for operating the vehicle-mounted device 200 as whole or part of the apparatus may be stored in a computer-readable recording medium, such as a memory card, a CD-ROM, a DVD, an MO (Magneto Optical Disk) for distribution, and the computer program may be installed on another computer, such as a portable phone, an audio device, and an electronic watch to cause the computer to operate the vehicle-mounted device 200 or to cause the computer to execute steps performed by the vehicle-mounted device 200. Furthermore, a program may be stored in a disk device or the like included in a server device on the Internet, and for example, the program may be downloaded to a computer serving as the vehicle-mounted device 200 by superimposing the program on a carrier wave.

The invention claimed is:

1. A road traffic information providing device which receives alarm information from a roadside apparatus installed on or near a road with a vehicle traveling or a parking lot through wireless communication and which outputs the alarm information,
the road traffic information providing device comprising: a predetermined operation unit; and a control unit,
wherein the control unit outputs the alarm information supplied by the roadside apparatus in utterance again from a top by speech based on a predetermined operation of the operation unit if other alarm information is not outputted in utterance.

2. A road traffic information providing device which receives alarm information from a roadside apparatus installed on or near a road with a vehicle traveling or a parking lot through wireless communication and which outputs the alarm information, the road traffic information providing device comprising:
a communication unit for receiving the alarm information from the roadside apparatus at timing at which a link is set up with the roadside apparatus;
a storage unit for storing the alarm information;
an audio processing unit for converting the alarm information into speech information to output the speech information in utterance;
an operation unit for controlling the utterance output as needed; and
alarm information transfer means for reading out the alarm information stored in the storage unit according to priority to transfer the alarm information to the audio processing unit if an operation of the operation unit is not performed and for transferring the alarm information again to the audio processing unit from a first portion of the alarm information which has been outputted in utterance when the operation is performed if the operation of the operation unit is performed.

3. A road traffic information providing device which receives alarm information from a roadside apparatus installed on or near a road with a vehicle traveling or a parking lot through wireless communication and which outputs the alarm information, the road traffic information providing device comprising:
a communication unit for receiving the alarm information from the roadside apparatus at timing at which a link is set up with the roadside apparatus;
a storage unit for storing the alarm information;
an audio processing unit for converting the alarm information into speech information to output the speech information in utterance;
an operation unit for controlling the utterance output as needed; and
alarm information transfer means for reading out the alarm information stored in the storage unit according to priority to transfer the alarm information to the audio processing unit if an operation of the operation unit is not performed and for transmitting the utterance output stop signal to the audio processing unit and then transferring the alarm information again to the audio processing unit from a first portion of the alarm information which has been outputted in utterance when the operation is performed if the operation of the operation unit is performed.

4. The road traffic information providing device according to claim 3, wherein
if the communication unit does not receive disaster information as one of the alarm information from another roadside apparatus when a predetermined operation is performed by the operation unit, the alarm information transfer means transmits the utterance output stop signal to the audio processing unit and then transfers the alarm information again to the audio processing unit from the first portion of the alarm information which has been outputted in utterance when the operation is performed.

5. The road traffic information providing device according to claim 3, wherein
if a predetermined operation is performed in the operation unit after a predetermined time has passed after the termination of the utterance output of all the alarm information stored in the storage unit, the alarm information transfer means reads out the alarm information excluding safe driving support information as one of the alarm information from all the alarm information stored in the storage unit according to the priority and transfers the alarm information to the audio processing unit.

6. The road traffic information providing device according to claim 3, wherein
if safe driving support information not outputted in utterance is stored in the storage unit when a predetermined operation is performed in the operation unit while predetermined alarm information is being outputted in utterance according to the priority, the alarm information transfer means transmits the utterance output stop signal to the audio processing unit, transfers the safe driving support information to the audio processing unit, and then transfers interrupted alarm information to the audio processing unit from the top.

7. The road traffic information providing device according to claim 3, wherein
if disaster information and/or safe driving support information is received from another roadside apparatus when a predetermined operation is performed in the operation unit while predetermined alarm information is being outputted in utterance according to the priority, the alarm information transfer means transmits the utterance output stop signal to the audio processing unit, transfers the disaster information and/or the safe driving support information to the audio processing unit, and then transfers interrupted alarm information to the audio processing unit from the top.

8. A road traffic information providing system comprising: a roadside apparatus, installed on or near a road with a vehicle traveling or a parking lot, for transmitting alarm information through wireless communication; a vehicle-mounted device mounted on the vehicle for receiving the alarm information from the roadside apparatus through the wireless communication and for outputting the alarm information; and an administration server for communicating various information with the roadside apparatus,
wherein the vehicle-mounted device comprises: a predetermined operation unit; and a control unit, and
wherein the control unit outputs the alarm information supplied by the roadside apparatus in utterance again from a top by speech based on a predetermined operation of the operation unit.

9. A road traffic information providing method of receiving, by a road traffic information providing device, alarm information from a roadside apparatus installed on or near a road with a vehicle traveling or a parking lot through wireless communication and of outputting the alarm information, the road traffic information providing method comprising the steps of:

receiving the alarm information from the roadside apparatus at timing at which a link is set up between the road traffic information providing device and the roadside apparatus;

storing the alarm information;

converting the alarm information into speech information to output the speech information in utterance;

controlling the utterance output as needed; and transferring alarm information by reading out the stored alarm information according to priority of the alarm information and outputting the alarm information in utterance if an operation is not performed and outputting the alarm information in utterance again from a first portion of the alarm information which has been outputted in utterance when the operation is performed if the operation is performed.

10. A non-transitory computer-readable medium which stores a program to cause a computer to function as:

a communication unit for receiving alarm information from a roadside apparatus at timing at which a link is set up between a road traffic information providing device and the roadside apparatus;

a storage unit for storing the alarm information;

an audio processing unit for converting the alarm information into speech information to output the speech information in utterance;

an operation unit for controlling the utterance output as needed; and alarm information transfer means for reading out the alarm information stored in the storage unit according to priority of the alarm information to transfer the alarm information to the audio processing unit if an operation of the operation unit is not performed and for transmitting an utterance output stop signal to the audio processing unit to transfer the alarm information again to the audio processing unit from first portion of the alarm information which has been outputted in utterance when the operation is performed if the operation of the operation unit is performed.

* * * * *